(12) United States Patent
Gao et al.

(10) Patent No.: US 10,880,780 B2
(45) Date of Patent: Dec. 29, 2020

(54) COMMON PROCESS IMPLEMENTATION METHOD, APPARATUS AND SYSTEM

(71) Applicant: ZTE Corporation, Guangdong (CN)

(72) Inventors: Yin Gao, Guangdong (CN); He Huang, Guangdong (CN)

(73) Assignee: ZTE CORPORATION, Shenzhen (CN)

(*) Notice: Subject to any disclaimer, the term of this patent is extended or adjusted under 35 U.S.C. 154(b) by 25 days.

(21) Appl. No.: 16/261,530

(22) Filed: Jan. 29, 2019

(65) Prior Publication Data

US 2019/0174358 A1 Jun. 6, 2019

Related U.S. Application Data

(63) Continuation of application No. PCT/CN2017/093568, filed on Jul. 19, 2017.

(30) Foreign Application Priority Data

Jul. 29, 2016 (CN) .......................... 2016 1 0616340

(51) Int. Cl.
*H04W 28/16* (2009.01)
*H04W 28/18* (2009.01)
(Continued)

(52) U.S. Cl.
CPC ............ *H04W 28/16* (2013.01); *H04W 28/18* (2013.01); *H04W 92/045* (2013.01); *H04W 92/14* (2013.01)

(58) Field of Classification Search
None
See application file for complete search history.

(56) References Cited

U.S. PATENT DOCUMENTS

2008/0188228 A1* 8/2008 Pecen .................. H04W 48/18
455/449
2011/0243097 A1 10/2011 Lindqvist et al.
(Continued)

FOREIGN PATENT DOCUMENTS

CN 102378209 A 3/2012
EP 2667665 A1 11/2013
(Continued)

OTHER PUBLICATIONS

Ericsson, "Network Slice Selection for 5G," 3GPP TSG-RAN WG3 #93, Gothenburg, Sweden, R3-161889, 7 pages, Aug. 2016.
(Continued)

*Primary Examiner* — Mazda Sabouri
(74) *Attorney, Agent, or Firm* — Perkins Coie LLP

(57) ABSTRACT

Provided are a method, apparatus and system for implementing a common process. The method includes that: a base station transmits a first request message to a CN device, the first request message being used for applying for establishing a first interface, the first interface being an interface between a radio access network (RAN) to which the base station belongs and a CN, and the first request message carrying at least one of: location area information of a specific geographical area configured for paging a UE, information of a public land mobile network (PLMN) supported by the base station, and base station type information of the base station; and the base station receives a first response message transmitted by the CN device, where the first response message is used for indicating that the first interface has been successfully established.

22 Claims, 8 Drawing Sheets

(51) Int. Cl.
*H04W 92/04* (2009.01)
*H04W 92/14* (2009.01)

(56) References Cited

U.S. PATENT DOCUMENTS

| | | | | |
|---|---|---|---|---|
| 2012/0196617 | A1* | 8/2012 | Sun | H04W 36/0061 |
| | | | | 455/456.1 |
| 2014/0148165 | A1 | 5/2014 | Serravalle et al. | |
| 2014/0204838 | A1 | 7/2014 | Kubota et al. | |
| 2016/0212635 | A1* | 7/2016 | Cho | H04W 92/20 |
| 2016/0277926 | A1* | 9/2016 | Molina | H04L 63/1458 |

FOREIGN PATENT DOCUMENTS

| | | |
|---|---|---|
| KR | 10-2011-0053469 A | 5/2011 |
| KR | 10-2014-0130190 A1 | 11/2014 |
| WO | 2013/126847 A1 | 8/2013 |

OTHER PUBLICATIONS

International Search Report and Written Opinion dated Oct. 17, 2017 for International Application No. PCT/CN2017/093568, filed on Jul. 19, 2017 (13 pages).
QUALCOMM Incorp., "Intra-RAN Coordination," 3GPP TSG-RAN WG3 Meeting #91bis, Bangalore, India, R3-160825, 3 pages, Apr. 2016.
Samsung, "General principles for RAN-CN interface," 3GPP TSG-RAN WG3 Meeting #92, Nanjing, P.R. China, R3-161451, 1 page, May 2016.
Samsung, "Inter-RAT with LTE," 3GPP TSG-RAN WG3 Meeting #91bis, Bangalore, India, R3-160674, 3 pages, Apr. 2016.
Chinese Office Action dated Oct. 22, 2019 for Chinese Application No. 201610616340.6, filed on Jul. 29, 2016 (6 pages).
Ericsson, "Principles of Network Slicing for 5G," 3GPP TSG-RAN WG3 #92, Nanjing, P.R. China, R3-161292, 5 pages, May 2016.
Korean Notice of Allowance dated Oct. 30, 2019 for Korean Application No. 10-2019-7006309, filed on Jul. 29, 2017 (6 pages).
ZTE, "Network Slice Selection Procedure," 3GPP TSG RAN WG3 Meeting #92, Nanjing, China, R3-161107, 4 pages, May 2016.
3GPP, 3rd Generation Partnership Project; Technical Specification Group Radio Access Network; Evolved Universal Terrestrial Radio Access Network (E-UTRAN); S1 Application Protocol (S1AP) (Release 13), 3GPP TS 36.413 v13.3.0, Sophia Antipolis, Valbonne, France, 331 pages, Jun. 2016.
Extended Search Report dated Jan. 24, 2020 for European Application No. 17833475.1, filed on Jul. 19, 2017 (9 pages).
Huawei, "The Addition of IEs in S1 Setup Procedure", 3GPP TSG RAN WG3 Meeting #59bis, Shenzhen, China, R3-080752, 2 pages, Apr. 2008.
Korean Notice of Allowance dated Sep. 19, 2020 for Korean Application No. 10-2020-7002766, filed on Jul. 29, 2017 (6 pages).

\* cited by examiner

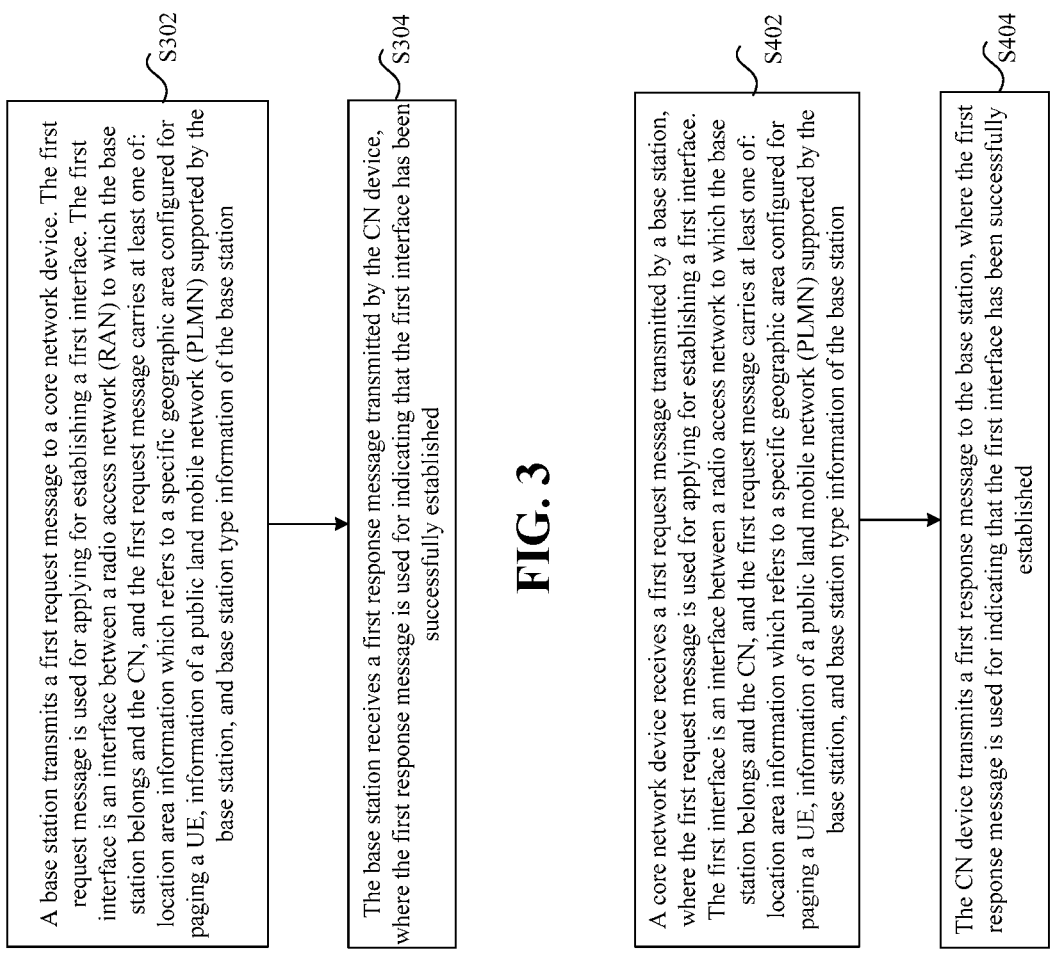

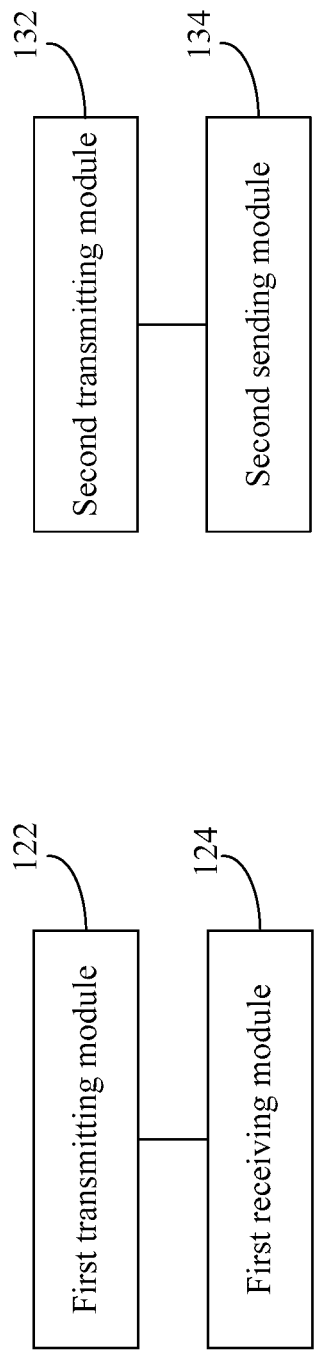
FIG. 12
FIG. 13
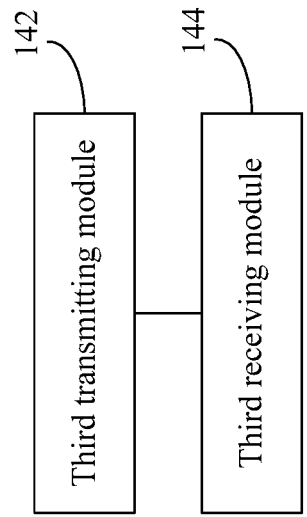
FIG. 14

COMMON PROCESS IMPLEMENTATION METHOD, APPARATUS AND SYSTEM

CROSS REFERENCE TO RELATED APPLICATIONS

This patent document is a continuation of and claims priority to International Patent Application No. PCT/CN2017/093568, filed on Jul. 19, 2017, which claims the benefit of priority of Chinese Patent Application No. 201610616340.6, filed on Jul. 29, 2016. The entire contents of the before-mentioned patent applications are incorporated by reference as part of the disclosure of this application.

TECHNICAL FIELD

The present disclosure relates to the field of communications, for example, to a method, apparatus and system for implementing a common process.

BACKGROUND

With the continuous evolution of wireless communication technologies and protocol standards, the mobile packet service has developed tremendously, and the data throughput capability of a single terminal has been continuously improved. Taking Long Term Evolution (LTE) system as an example, data transmission at a maximum downlink rate of 100 Mbps may be supported in a 20 M bandwidth. In the subsequent enhanced LTE system and its subsequent fifth generation (5G) mobile communication technology system with the fifth generation mobile phone communication standard, the data transmission rate will be further increased, even reaching tens of Gbps. The features of 5G technology include: seamless wide-area coverage, large-capacity hotspots, large number of connections with low power consumption, high reliability with low latency, and the like. One of the design goals of Release 14 for the next-generation radio access network (RAN), released by the 3rd Generation Partnership Project (3GPP), is to use a single technology architecture to support multiple types of traffic such as the enhanced mobile broadband (eMBB), the massive machine type communications (mMTC), and the ultra reliable and low latency communications (URLLC). In order to achieve the above goals, the design of the user plane architecture in the 5G New Rat (NR) needs to be flexible enough.

In recent years, the network deployment of a centralized, cooperative, cloud & clean-radio access network (C-RAN) of a baseband unit (BBU) and a radio remote unit (RRU) has been more and more widely applied in many countries and regions around the world. In order to shield the diversified underlying access technology and support traffic-oriented access, the radio access network (RAN) of the 5G access network includes a two-level network functional architecture which includes a wireless center unit (CU) and a wireless distributed unit (DU), similar to the architecture of BBU+RRU in LTE. FIG. 1 is a diagram showing a network architecture in which a CU and a DU are deployed in the same network device according to the related art. As shown in FIG. 1, Core represents the core network and NR BS represents the New Rat Base Station. This deployment mode is called a distributed network architecture. FIG. 2 is a diagram showing a network architecture in which a CU and a DU are deployed in different network devices according to the related art. As shown in FIG. 2, this deployment mode is called a centralized network architecture. The CU satisfies the user-centered design concept, and is responsible for the centralized control and management functions of the wireless network, and may serve as a traffic anchor point for the user terminal. The DU is a remote access unit and includes a radio frequency function and a partial processing function. The interface between the CU and the DU may be called fronthaul, and the specific division position of the fronthaul (that is, the location at which the division is performed on the user plane) is currently being standardized.

In addition, in order to achieve the goal of large capacity in 5G, a high frequency band and a large bandwidth are bound to be adopted. The high frequency band tends to have a small coverage due to its propagation characteristics. Therefore, some technical means are required to make the massive multiple-input-multiple-output (MM) came into being. By adopting the beam forming technology, the link performance of the MM may be greatly improved, and thus the purpose of improving coverage and capacity is naturally achieved. The MM is considered as an effective way to increase the transmission rate of modern wireless communication systems, and is a key technology for improving coverage range and capacity in the 5G communication system. In the 5G technology report (TR) 38.913, a variety of scenarios are involved, and the number of antennas used in the MM may reach up to 256. The adoption of the beam forming technology by the MM has brought about the demand for beam management. The switching of beams and the mobility under beams are all issues to be considered.

At the same time, the "one-size-fits-all" network architecture of the traditional cellular network has dedicated support and IT systems, may predict traffic and traffic growth, and is very suitable for a single service-type user network. However, with this vertical architecture, it is difficult for operators to expand the telecommunications network and to adjust and meet the needs of new use cases according to changing user needs. Therefore in the 5G era, the traditional cellular network and "one-size-fits-all" method need to be adjusted to support the use of thousands of use cases, numerous user types, and various applications.

In the 5G system, the network will further be abstracted into network slices. Such connection service is defined by functions implemented by lots of custom software. The software functions include geographic coverage area, duration, capacity, speed, latency, reliability, security, availability, and the like. The network slice may be interpreted as a collection of a set of functions. For example, a power company needs to provide connection for their smart meters. This requirement may be translated into network slices connecting a series of machine-to-machine (M2M) devices. The network slice has a certain latency and the data rate is sufficient to complete the status update and download at the specified time. However, the service requires a high level of security, high availability, and high reliability. The power company may also need to provide connection for their fault sensors. Network slices providing such services may receive status metrics from all M2M devices in the system throughout the day, and require pure data coverage with high availability and high endurance, and have medium level of security and moderate latency. At the same time, the network slice providing the connection service based on the use case may be configured with various network functions, such as achieving a higher level of security or near zero latency.

Currently there is no effective solution for the problem of a lack of a method for implementing a common process of a ground interface in the 5G system or the eLTE system in the existing art.

SUMMARY

The embodiments provide a method, apparatus and system for implementing a common process, to solve at least the problem of a lack of a method for implementing a common process of a ground interface in the 5G system or the eLTE system in the related art.

An embodiment provides a method for implementing a common process, which may include:

transmitting, by a base station, a first request message to a core network (CN) device, wherein the first request message is used for applying for establishing a first interface between a radio access network (RAN) to which the base station belongs and a CN, and the first request message carries at least one of: location area information, information of a public land mobile network (PLMN) supported by the base station, and base station type information of the base station; where the location area information refers to a specific geographic area configured for paging a user equipment (UE); and receiving, by the base station, a first response message transmitted by the CN device, where the first response message is used for indicating that the first interface has been successfully established.

An embodiment further provides another method for implementing a common process, including:

receiving, by a core network (CN) device, a first request message transmitted by a base station, where the first request message is used for applying for establishing a first interface between a radio access network (RAN) to which the base station belongs and a CN, and the first request message carries at least one of: location area information, information of a public land mobile network (PLMN) supported by the base station, and base station type information of the base station; where the location area information refers to a specific geographic area configured for paging a user equipment (UE); and transmitting, by the CN device, a first response message to the base station, where the first response message is used for indicating that the first interface has been successfully established.

An embodiment further provides an apparatus for implementing a common process, applied to a base station, including:

a first transmitting module, which is configured to transmit a first request message to a CN device, where the first request message is used for applying for establishing a first interface between a RAN to which the base station belongs and a CN, and the first request message carries at least one of: location area information, information of a PLMN supported by the base station, and base station type information of the base station; wherein the location area information refers to a specific geographic area configured for paging a UE; and a first receiving module, which is configured to receive a first response message sent by the CN device, where the first response message is used for indicating that the first interface is successfully established.

An embodiment further provides an apparatus for implementing a common process, which is applied to a core network (CN) device and may include:

a second receiving module, which is configured to receive a first request message transmitted by a base station, where the first request message is used for applying for establishing a first interface between a RAN to which the base station belongs and a CN, and the first request message carries at least one of: location area information, information of a PLMN supported by the base station, and base station type information of the base station; where the location area information refers to a specific geographic area configured for paging a UE; and a second transmitting module, which is configured to transmit a first response message to the base station, where the first response message is used for indicating that the first interface has been successfully established.

An embodiment further provides a system for implementing a common process, which may include a base station and a core network (CN) device.

The base station transmits a first request message to the CN device. The first request message is used for applying for establishing a first interface between a radio access network to which the base station belongs and a CN, and the first request message carries at least one of: location area information, information of a PLMN supported by the base station, and base station type information of the base station. The location area information refers to a specific geographic area configured for paging a UE.

The CN device receives the first request message and transmits a first response message to the base station. The first response message is used for indicating that the first interface has been successfully established.

The base station receives the first response message transmitted by the CN device.

An embodiment further provides a method for implementing a common process, which may include:

transmitting, by a first base station, a second request message to a second base station, wherein the second request message is used for applying for establishing a second interface between the first base station and the second base station, and the second request message carries at least one of: cells under the first base station, beam configuration information, information of a public land mobile network (PLMN) supported by the first base station, radio access network (RAN) architecture information, and information of a core network (CN) connected to the base station; wherein the information of the CN comprises at least one of: CN set information, CN cloud set identification information, and base station type information of the first base station; and receiving, by the first base station, a second response message transmitted by the second base station, wherein the second response message is used for indicating that the second interface has been successfully established.

An embodiment further provides an apparatus for implementing a common process, which is applied to a first base station and may include:

a third transmitting module, which is configured to transmit a second request message to a second base station, wherein the second request message is used for applying for establishing a second interface between the first base station and the second base station, and the second request message carries at least one of: cells under the first base station, beam configuration information, information of a PLMN supported by the first base station, RAN architecture information, and information of a CN connected to the base station; wherein the information of the CN comprises at least one of: CN set information, CN cloud set identification information, and base station type information of the first base station; and a third receiving module, which is configured to receive a second response message transmitted by the second base station, wherein the second response message is used for indicating that the second interface has been successfully established.

An embodiment further provides a computer-readable storage medium storing computer-executable instructions for executing any method described above.

An embodiment further provides a base station including one or more processors, a memory and one or more programs. When executed by the one or more processors, the one or more programs, which are stored in the memory, execute the corresponding method for implementing a common process described above.

An embodiment further provides a CN device including one or more processors, a memory and one or more programs. When executed by the one or more processors, the one or more programs, which are stored in the memory, execute the corresponding method for implementing a common process described above.

An embodiment further provides a computer program product including a computer program stored on a non-transient computer-readable storage medium. The computer program includes program instructions which, when executed by a computer, cause the computer to execute any of the above-mentioned methods.

In the process of establishing an interface between the base station and the CN, the interaction information between the base station and the CN carries application layer parameters applicable to the 5G system or the eLTE system. A common process is designed according to the above-mentioned parameters, solving the problem of a lack of a method for implementing a common process of a ground interface in the 5G system or the eLTE system in the related art, and adapting to the new requirements and changes of the 5G system or the eLTE system.

BRIEF DESCRIPTION OF DRAWINGS

FIG. 3 is a flowchart 1 of a method for implementing a common process according to an embodiment 1;

FIG. 4 is a flowchart 2 of a method for implementing a common process according to the embodiment 1;

FIG. 12 is a structural block diagram of an apparatus for implementing a common process, applied to a base station, according to an embodiment 2;

FIG. 13 is a structural block diagram of an apparatus for implementing a common process, applied to a core network (CN), according to the embodiment 2;

FIG. 14 is a structural block diagram of an apparatus for implementing a common process, applied to a first base station, according to the embodiment 2;

DETAILED DESCRIPTION

Figure 2:
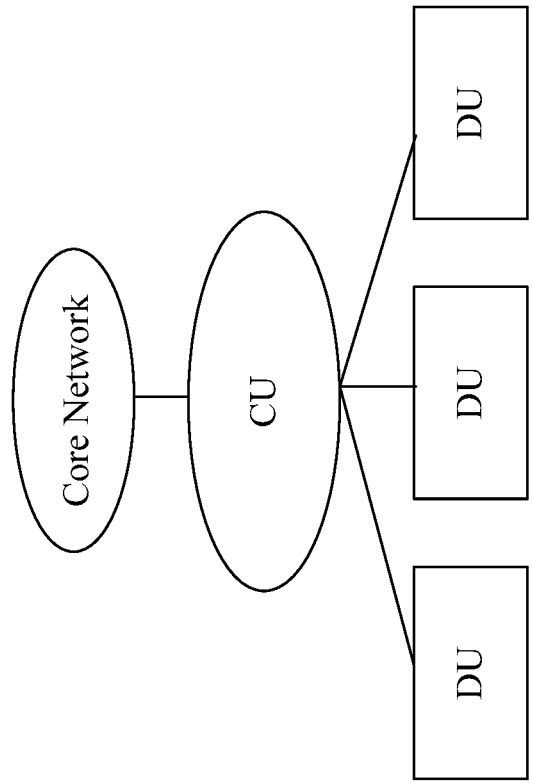
FIG. 2 is a diagram showing a network architecture in which a CU and a DU are deployed in different network devices according to the existing art.
Figure 1:
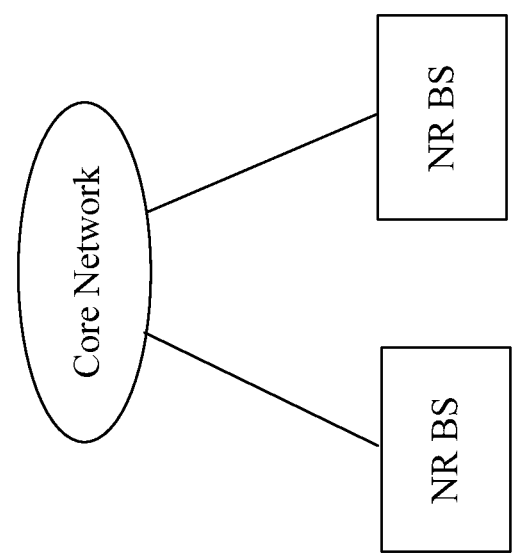
FIG. 1 is a diagram showing a network architecture in which a CU and a DU are deployed in the same network device according to the related art.

The terms "first", "second" and the like in the specification, claims and above drawings of the present disclosure are used to distinguish between similar objects and are not necessarily used to describe a particular order or sequence.

The embodiments of the present disclosure may be applied to a 5G system, or an eLTE system.

Embodiment 1

An embodiment provides a method for implementing a common process running on the above network architecture. FIG. 3 is a flowchart 1 of the method for implementing a common process according to the embodiment. As shown in FIG. 3, the process includes steps described below.

In S302, a base station sends a first request message to a core network (CN) device. The first request message is used for applying for establishing a first interface which is an interface between a radio access network (RAN) to which the base station belongs and the CN, and the first request message carries at least one of: location area information, information of a public land mobile network (PLMN) supported by the base station, and base station type information of the base station. The location area information refers to a specific geographic area configured for paging a user equipment (UE).

In S304, the base station receives a first response message sent by the CN device, where the first response message is used for indicating that the first interface has been successfully established.

With the above-mentioned steps, the problem of a lack of a method for implementing a common process of a ground interface in the 5G system or the eLTE system in the related art is solved, which adapts to the new requirements and changes of the 5G system or the eLTE system.

Alternatively, the first response message carries at least one of: configuration information of the CN, information of network slices supported by the CN, and allowed load capacity information of each type of slice group in the CN.

The UE selects a network slice in the CN according to the allowed load capacity information of the slice group, and uses the allowed load capacity information of the network slice as a component of text content of the UE.

Alternatively, the configuration information of the CN includes at least one of: a CN set identification, a number of the CN device, the PLMN information, and CN cloud set identification information.

Alternatively, after receiving the first response message transmitted by the CN device, the base station transmits a first update message to the CN device, where the first update message is used for instructing the CN device to update configuration information of the base station.

And the base station receives a first confirmation message for the first update message transmitted by the CN device.

Alternatively, the first update message carries at least one of: location area information and public land mobile network (PLMN) information.

The same name in the present disclosure has the same use. Unless otherwise expressly stated in the following, a message, which has been described in the foregoing, is considered to represent the same meaning in the present disclosure.

Alternatively, after the base station receives the first response message transmitted by the CN device, the base station receives an overload start message or an overload stop message transmitted by the CN device. The overload start message is used for indicating that the CN is overloaded, and the overload stop message is used for indicating that an overload operation is stopped.

Alternatively, the overload start message carries a slice overload message for indicating that a slice of the CN is overloaded or that a slice of the CN under a specified PLMN is overloaded.

Alternatively, the overload start message transmitted by the CN and received by the base station may include overload control operation information, where the overload control operation information may include reject information for indicating a slice of the CN that rejects access.

FIG. 4 is a flowchart 2 of a method for implementing a common process according to the embodiment. As shown in FIG. 4, the process includes steps described below.

In S402, a core network (CN) device receives a first request message transmitted by a base station, where the first request message is used for applying for establishing a first interface. The first interface is an interface between a radio access network (RAN) to which the base station belongs and the CN, and the first request message carries at least one of: location area information, information of a public land mobile network (PLMN) supported by the base station, and base station type information of the base station; where the location area information refers to a specific geographic area configured for paging a user equipment (UE).

In S404, the CN device transmits a first response message to the base station, where the first response message is used for indicating that the first interface has been successfully established.

Alternatively, after the core network (CN) device receives the first request message transmitted by the base station, the CN device receives first instruction information sent by a user equipment (UE), where the first instruction information is used for instructing the CN device to select a traffic pattern for the UE.

Alternatively, the first response message carries at least one of: configuration information of the CN, information of network slices supported by the CN, and allowed load capacity information of each type of slice group in the CN. The user equipment (UE) selects a network slice in the CN according to the allowed load capacity information of the network slice, and uses the allowed load capacity information of the slice as a component of text content of the UE.

Alternatively, the configuration information of the CN includes at least one of:

a CN set identification, the number of the CN device, the PLMN information, and CN cloud set identification information.

Alternatively, after the CN device transmits the first response message to the base station, the method further includes that: the CN device transmits a second update message to the base station, where the second update message is used for instructing the base station to update configuration information of the CN device; and the CN device receives a second confirmation message for the second update message transmitted by the base station.

Alternatively, the second update message carries at least one of: configuration information of the CN, information of network slices supported by the CN, and allowed load capacity information of each type of slice group in the CN. The configuration information of the CN includes at least one of: a CN set identification, the number of the CN device, the PLMN information, and CN cloud set identification information. The user equipment (UE) selects a network slice in the CN according to the allowed load capacity information of the network slice, and uses the allowed load capacity information of the network slice as a component of text content of the UE.

Alternatively, after the CN device transmits a first response message to the base station, the CN device transmits an overload start message or an overload stop message to the base station. The overload start message is used for indicating that the CN is overloaded, and the overload stop message is used for indicating that an overload operation is stopped.

Alternatively, the overload start message carries a slice overload message for indicating that a slice of the CN is overloaded or that a slice of the CN under a specified PLMN is overloaded.

Alternatively, the overload start message transmitted by the CN to the base station may include overload control operation information, where the overload control operation information may include reject information for indicating a slice of the CN that rejects access.

Figure 5:
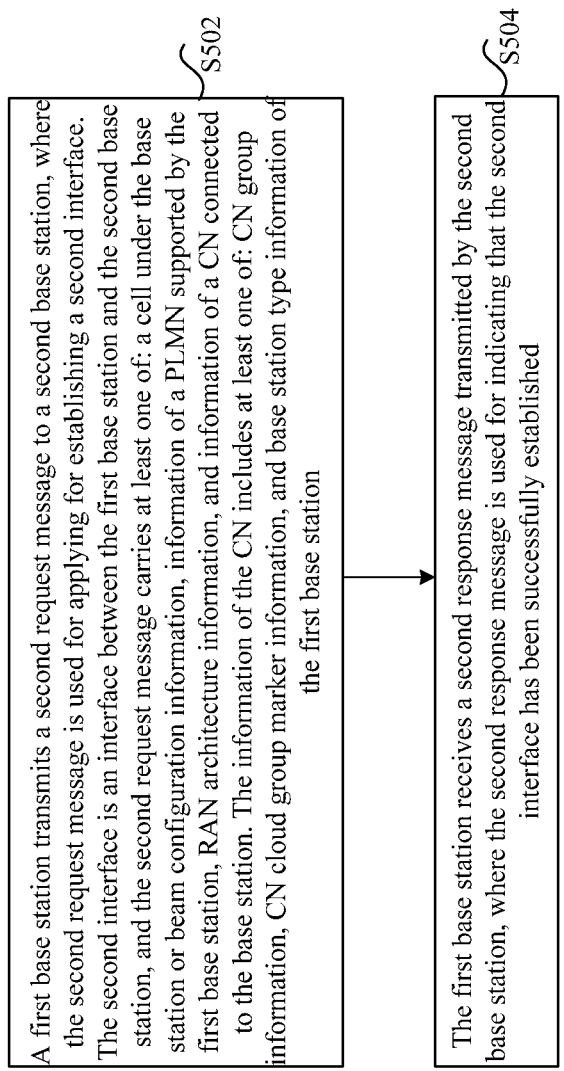
FIG. 5 is a flowchart 3 of a method for implementing a common process according to the embodiment 1.

FIG. 5 is a flowchart 3 of a method for implementing a common process according to the embodiment. As shown in FIG. 5, the process includes steps described below.

In S502, a first base station sends a second request message to a second base station, where the second request message is used for applying for establishing a second interface. The second interface is an interface between the first base station and the second base station, and the second request message carries at least one of: cells under the first base station, beam configuration information, information of a PLMN supported by the first base station, radio access network (RAN) architecture information, information of a core network (CN) connected to the base station, and base station type information of the first base station. The information of the CN includes at least one of: set information of the CN and cloud group identification information of the CN.

In S504, the first base station receives a second response message transmitted by the second base station, where the second response message is used for indicating that the second interface has been successfully established.

The steps in FIG. 5 are performed between a base station and another base station, and the base stations belong to the radio access network (RAN) in the communication system. With the steps in FIG. 3 or 4, an interface has been established between the RAN and the core network (CN), and thus a part of the common process of the ground interface is implemented. FIG. 5 is another part of implementing the common process of the ground interface, that is, the interface establishment process inside the RAN.

Alternatively, the RAN architecture information may include layered mode information of a wireless center unit (CU)-wireless distributed unit (DU) when the RAN architecture information is a centralized network architecture.

Alternatively, after the first base station receives the second response message sent by the second base station, the first base station sends a third update message to the second base station, where the third update message is used for instructing the second base station to update configuration information of the first base station; and the first base station receives a second confirmation message corresponding to the third update message sent by the second base station.

Alternatively, the third update message carries at least one of: cells under the first base station after the configuration information of the first base station is updated, beam configuration information after the configuration information of the first base station is updated, RAN architecture information of the first base station, information of a CN connected to the first base station, and base station type information of the first base station.

The present disclosure is described by taking the establishment of the common process of the ground interface in the 5G system as an example in the embodiment.

The embodiment provides a method for implementing the ground interface common process as described below. For convenience of description, an interface between a 5G RAN and a 5G CN is referred to as the first interface (i.e., the interface between the base station and the CN), and an interface between the 5G RAN and the 5G RAN node is referred to as the second interface (i.e., the interface between the base station and the base station).

1) Method for implementing a common process of the interface between the RAN and the CN (the first interface)

The common process supported by the first interface in the 5G system may include but is not limited to the process described below.

The establishment process of the first interface includes: an interface establishment request message (sent by the base station in the RAN to the CN, and equivalent to the first request message in the above embodiment), an interface establishment response message (sent by the CN to the base station, and equivalent to the first response message in the above embodiment), and an interface establishment failure message (sent by the CN to the base station).

The first interface establishment request message may include information of the location area supported by the 5G base station and information of all PLMN supported by the 5G base station. When the UE is in an idle state, the CN can know the location area where the UE is located, which may be used for paging the UE in the idle state.

The first interface establishment request message may include base station type information, such as an eLTE base station or a NR (in the embodiment, referred to as a 5G system) base station, and the 5G CN is noticed of the base station type information. The number of connected base stations under the core network may be very large, so the configuration information related to the base stations is difficult to implement through the operation administration and maintenance (OAM). The information may be carried in the first interface establishment request message or may be carried through UE-related signaling, for example, carried in an initial direct transfer message and indicating the type of the system that the UE currently accesses. The information may be used by the CN to select an appropriate traffic pattern for the UE according to the UE type.

The first interface establishment response message may include 5G CN configuration information, such as at least one of a 5G CN set identification, device number, and PLMN information. If the 5G CN is clouded, the 5G CN configuration information may further carry the cloud group identification information.

The first interface establishment response message may include information related to network slices of the 5G CN, and identifiers (IDs) of several slices supported by the CN are delivered to the base station in the interface establishment response message. Alternatively, the interface establishment response message may further carry allowed load capacity information of each type of slice group in the CN. The information may be used by the UE, when accessing the CN, to select a core network slice according to the allowed load capacity information, and is also considered as a part of the text content of the UE.

After the first interface is established, in the case that a configuration of the base station needs to be updated, the interaction between the base station and the CN may be completed through the process described below, and the base station configuration updating process may include:

a base station configuration update message (sent by the base station to the CN, and equivalent to the first update message in the above embodiment), a base station configuration update confirmation message (sent by the CN to the base station, and equivalent to the first confirmation message in the above embodiment), and a base station configuration update failure message (sent by the CN to the base station).

The base station configuration update message for the first interface may include information of the location area supported by the updated 5G base station, and the information of all PLMN currently supported by the 5G base station. When the UE is in an idle state, the CN can know the location area where the UE is located, which may be used for paging the UE in the idle state.

After the first interface is established, in the case that the configuration of the CN device needs to be updated, the interaction between the CN and the base station may be completed through the process described below, and the CN configuration updating process may include:

a CN configuration update message (sent by the CN to the base station, and equivalent to the second update message in the above embodiment), a CN configuration update confirmation message (sent by the base station to the CN, and equivalent to the second confirmation message in the above embodiment), and a CN configuration update failure message (sent by the base station to the CN).

The CN configuration update message of the first interface may include updated 5G CN configuration information, such as at least one of a 5G CN set identification, the device number, and PLMN information. If the 5G CN is clouded, the 5G CN configuration information may carry the cloud group identification information.

The CN configuration update message of the first interface may include information related to network slices of the updated 5G CN, and IDs of several slices supported by the CN are delivered to the base station in the CN configuration update message. Alternatively, the CN configuration update message may further carry allowed load capacity information of each type of slice group in the CN.

After the first interface is established, the process of the overload management by the CN includes: an overload start message (sent by the CN to the base station) and an overload stop message (sent by the CN to the base station).

In the overload start message, the overload management of the slice may be implemented, and the overload command of different slices or different slices under different PLMNs may be delivered. At the same time, the overload control operation may inform the base station that accessing to the slice of the core network is denied.

2) Method for implementing a common process of the interface between the RAN and the RAN (the second interface)

The common process supported by the first interface in the 5G system may include but is not limited to the process described below.

The establishment process of the second interface (i.e., the second interface between the base station and the base station) includes: a second interface establishment request message (sent by a RAN node 1 to a RAN node 2, and equivalent to the second request message in the above embodiment, where the nodes in the RAN are the base stations in the above embodiment), a second interface establishment response message (sent by the RAN node 2 to the RAN node 1, and equivalent to the second response message in the above embodiment), and a second interface establishment failure message (sent by the RAN node 2 to the RAN node 1).

The second interface establishment request message may include at least one of all serving cells under the 5G base station and the beam configuration information, for example, may include characteristic information of a high-frequency cell, such as a frequency bin and bandwidth, and may further include list information of PLMNs supported by the cells.

The second interface establishment request message may further include RAN architecture information, such as centralized architecture or distributed architecture. If the RAN architecture is centralized, the second interface establishment request message may further provide CU-DU layered mode information, which may be used as a determining factor when the base station selects a handover target for the UE.

The second interface establishment request message may further include information of a core network to which the 5G base station belongs, such as information of a core network group to which the base station belongs, or a cloud group ID, which may be used for determining a mobile type, such as initiating a handover based on the first interface or initiating a handover based on the second interface.

The second interface establishment request message may further include type information of the base station or the cell, such as LTE, eLTE, or 5G NR.

After the second interface between the base stations is established, if the configuration of the base station needs to be updated, the base station configuration updating process may include:

a base station configuration update message (from the RAN node 1 to the RAN node 2, and equivalent to the third update message in the above embodiment), a base station configuration update confirmation message (from the RAN node 2 to the RAN node 1, and equivalent to the third confirmation message in the above embodiment), and a base station configuration update failure message (from the RAN node 2 to the RAN node 1).

The base station configuration update message of the second interface may include at least one of the serving cells under the base station after the updating and beam configuration information, such as one or more serving cells under the base station, and information for performing beam addition, deletion, or modification.

The base station configuration update message of the second interface may further include at least one of the RAN architecture information of the base station after the updating, information of the core network to which the base station belongs, and type information of the base station or the cell.

The above-mentioned method also applies to the eLTE system. The RAN node may be an eLTE base station, and the CN node may be a mobility management entity (MME) or a 5G CN. Then an interface between the eLTE base station and the 5G CN or the MME may be the first interface, and an interface between the eLTE base station and the 5G base station or the eLTE base station may be the second interface.

Six sub-embodiments are involved in the following content, namely embodiments 1 to 6 described below, and a method for implementing a common process of 5G ground interface is provided.

The process of an embodiment 1 is described below.

1) The establishment process of the first interface includes: an interface establishment request message (sent by the base station to the CN), an interface establishment response message (sent by the CN to the base station), and an interface establishment failure message (sent by the CN to the base station).

Figure 6:
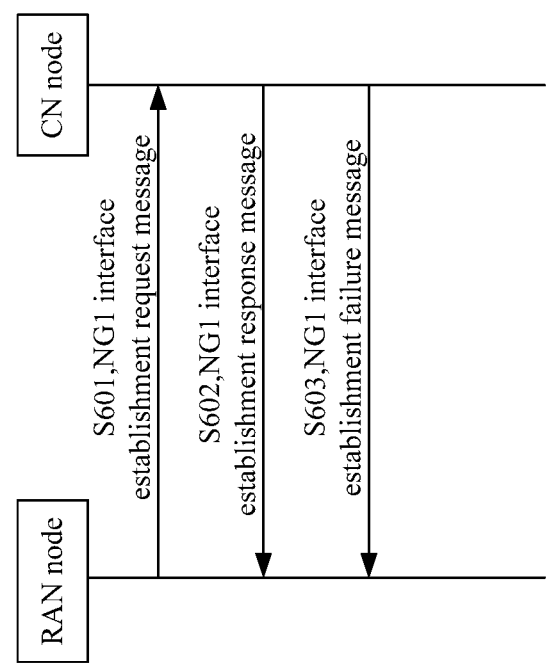
FIG. 6 is a flowchart of a method according to an embodiment 1 in the embodiment 1.

FIG. 6 is a flowchart of a method according to the embodiment 1. As shown in FIG. 6, the method includes steps described below.

In S601, a 5G base station sends a first interface establishment request message to a 5G CN.

The first interface establishment request message may include information of the location areas supported by the 5G base station and information of all PLMNs supported by the 5G base station. When the UE is in an idle state, the CN can know the location area where the UE is located, which may be used for paging the UE in the idle state. The location area may be set by the 5G network side. The first interface establishment request message may further include base station type information, such as an eLTE base station or a NR base station, and the 5G CN is noticed of the base station type information. The number of base stations connected to the MME may be very large, so the configuration information related to the base station is difficult to implement through the OAM. The information may be carried in the first interface establishment request message or may be carried through UE-related signaling. For example, the message is carried in an initial direct transfer message and indicates the type of the system that the UE currently accesses. The information may be used by the CN to select an appropriate traffic pattern for the UE according to the UE type.

In S602, if the process is successful, the 5G CN sends a first interface establishment response message to the 5G base station, and if the process is unsuccessful, S603 is performed.

The first interface establishment response message may include 5G CN configuration information, such as at least one of a 5G CN set identification, the device number, and PLMN information. If the 5G CN is clouded, the 5G CN configuration information may further include the cloud group identification information. The first interface establishment response message may include information related to network slices of the 5G CN. For example, IDs of slices supported by the CN are delivered to the base station in the interface establishment response message.

Alternatively, the above-mentioned first interface establishment response message may further carry allowed load capacity information of each type of slice group in the CN. The allowed load capacity information may be used by the UE, when accessing the CN, to select a core network slice and is considered as a part of the text content of the UE. For example, when the UE accesses the base station, the base station may select an appropriate core network slice for the UE according to the UE type, the traffic type, the load capacity information related to the slice, and the like.

In S603, the 5G CN sends a first interface establishment failure message to the 5G base station, where the message may include a failure cause, a waiting time, and the like.

The process of an embodiment 2 is described below.

2) The base station configuration updating process may include: a base station configuration update message (sent by the base station to the CN), a base station configuration update confirmation message (sent by the CN to the base station), and a base station configuration update failure message (sent by the CN to the base station).

Figure 7:
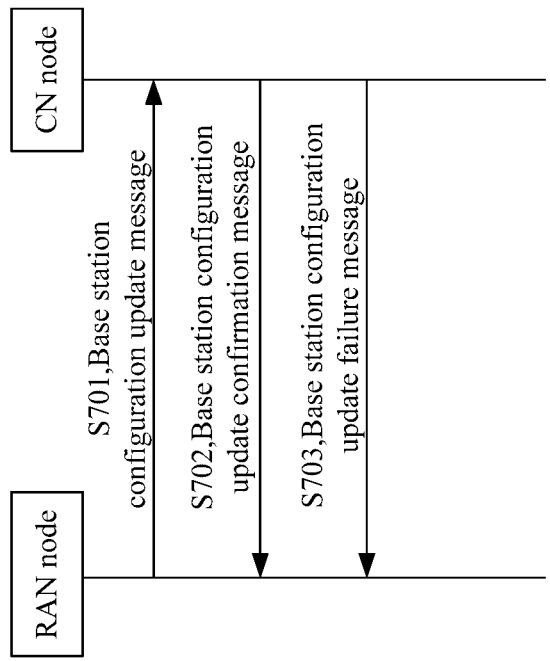
FIG. 7 is a flowchart of a method according to an embodiment 2 in the embodiment 1.

FIG. 7 is a flowchart of a method according to the embodiment 2. As shown in FIG. 7, the method includes the following steps.

In S701, a 5G base station sends the base station configuration update message to a 5G CN.

The base station configuration update message of the first interface may include information of the location areas supported by the updated 5G base station and the information of all PLMNs supported by the current 5G base station. When the UE is in an idle state, the CN can know the location area where the UE is located, and the location area may be used for paging the UE in the idle state.

In S702, if the process is successful, the 5G CN sends a base station configuration update confirmation message to the 5G base station. Otherwise, S703 is performed.

In S703, the 5G CN sends a base station configuration update failure message to the 5G base station.

The process of an embodiment 3 is described below.

3) The CN configuration updating includes: a CN configuration update message (sent by the CN to the base station), a CN configuration update confirmation message (sent by the base station to the CN), and a CN configuration update failure message (sent by the base station to the CN).

Figure 8:
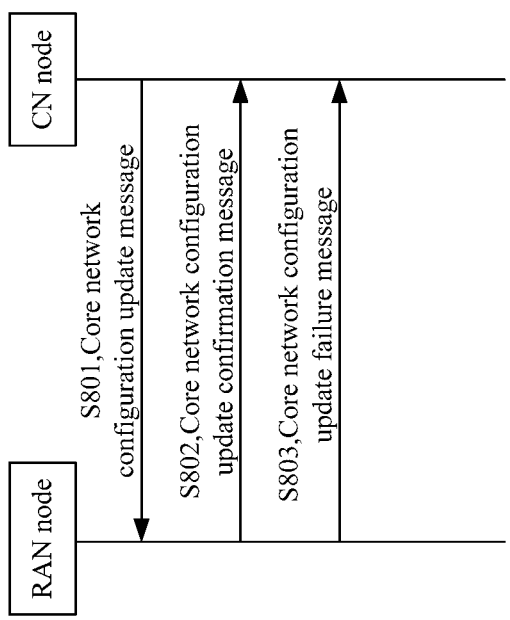
FIG. 8 is a flowchart of a method according to an embodiment 3 in the embodiment 1.

FIG. 8 is a flowchart of a method according to the embodiment 3. As shown in FIG. 8, the method includes the following steps.

In S801, a 5G CN sends the CN configuration update message, namely the CN configuration update message of a first interface, to a 5G base station.

The CN configuration update message of the first interface may include updated 5G CN configuration information, such as a 5G CN set identification, a device number, and PLMN information. If the 5G CN is clouded, the 5G CN configuration information may further include the cloud group identification information. The CN configuration update message of the first interface may further include information related to network slices of the updated 5G CN, and a plurality of slice IDs supported by the core network may be added to the interface establishment response message and delivered to the base station.

Alternatively, the CN configuration update message of the first interface may further carry allowed load capacity information of each type of slice group in the CN. The information may be used by the UE, when accessing to the CN, to select a core network slice and is considered as a part of the text content of the UE. For example, when the UE accesses the base station, the base station may select an appropriate core network slice for the UE according to the UE type, the traffic type, the load capacity information related to the slice, and the like.

In S802, if the process is successful, the 5G base station sends a CN configuration update confirmation message to the 5G CN. Otherwise, S803 is performed.

In S803, the 5G base station sends a CN configuration update failure message to the 5G CN.

The process of an embodiment 4 is described below.

4) The CN overload management may include: an overload start message (sent by the CN to the base station) and an overload stop message (sent by the CN to the base station).

Figure 9:
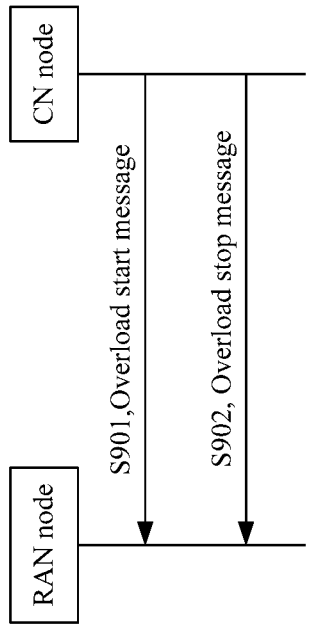
FIG. 9 is a flowchart of a method according to an embodiment 4 in the embodiment 1.

FIG. 9 is a flowchart of a method according to the embodiment 4. As shown in FIG. 9, the method includes the following steps.

In S901, when the 5G CN is overloaded, the 5G CN sends the overload start message to a 5G base station.

In the overload start message of a first interface, the overload management of the slice may be implemented, and the overload command of different slices or different slices under different PLMNs may be delivered. At the same time, the overload control operation may instruct the base station to deny the access of the slice-related user. Alternatively, after receiving the overload start message, the 5G base station may determine whether the current overload control operation overwrites the previous overload operation behavior according to the information carried in the overload start message. For example, when the base station receives a new overload operation command for the same slice, the previous overload operation command may be overwritten and the new overload operation command is directly executed. Similarly, the same rule may also be employed for the overload stop operation.

In S902, when the 5G CN needs to stop the overload operation, the 5G CN sends the overload stop message to the 5G base station.

The process of an embodiment 5 is described below.

5) The establishment process of the second interface may include: an interface establishment request message (from a RAN node 1 to a RAN node 2), an interface establishment response message (from the RAN node 2 to the RAN node 1), and an interface establishment failure message (from the RAN node 2 to the RAN node 1).

Figure 10:
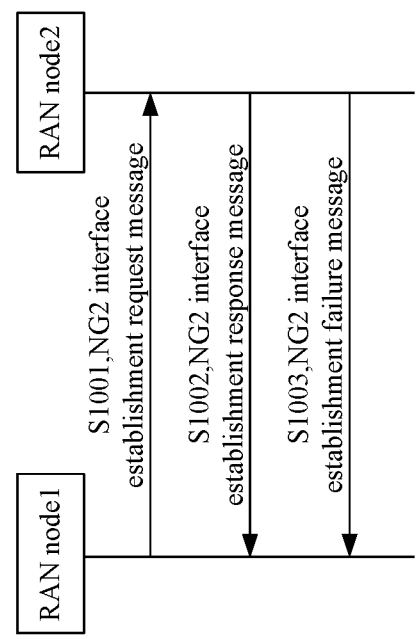
FIG. 10 is a flowchart of a method according to an embodiment 5 in the embodiment 1.

FIG. 10 is a flowchart of a method according to the embodiment 5. As shown in FIG. 10, the method includes the following steps.

In S1001, a 5G base station 1 sends a second interface establishment request message to a 5G base station 2.

The second interface establishment request message may include at least one of: all serving cells under the 5G base station 1 and the beam configuration information, for example characteristic information of a high-frequency cell, such as the cell identification information, frequency bin and bandwidth. If the beam information is included, the beam information includes one or more of the following information: the beam ID, the beam coverage range, and the number of beams in a single cell. The beam information may further include list information of PLMNs supported by the cell or the beam.

The second interface establishment request message may further include RAN architecture information of the 5G base station 1, such as centralized or distributed architecture information. If the RAN architecture is centralized, second interface establishment request message may further include CU-DU layered mode information, which may be used as a determining factor when the base station selects a handover target for the UE. The second interface establishment request message may further include information of a core network to which the 5G base station 1 belongs, such as information of a core network group to which the base station belongs, or a cloud group ID, which may be used for determining a mobile type, such as initiating a handover based on the first interface or initiating a handover based on the second interface.

The second interface establishment request message may further include type information of the 5G base station 1 or the cell, such as LTE, eLTE, or 5G NR, and may further include information related to network slices of the 5G CN supported by the 5G base station 1, such as ID information of one or more network slices of the 5G CN, which may be used for selecting an appropriate target base station for a terminal supporting the network slice when mobility determination is performed on the terminal.

In S1002, if the process is successful, the 5G base station 2 sends a second interface establishment response message to the 5G base station 1. Otherwise, S1003 is performed.

The second interface establishment response message may include at least one of: all serving cells under the 5G base station 2 and the beam configuration information, such as the cell identification information, the frequency bin and the bandwidth. If the beam configuration information is included in the second interface establishment response message, the beam configuration information includes one or more of: the beam ID, the beam coverage range, and the number of beams in a single cell. The second interface establishment response message may further include the list information of PLMNs supported by the cell or the beam. The second interface establishment request message may further include RAN architecture information of the 5G base station 2, such as centralized or distributed architecture information. If the RAN architecture is centralized, the second interface establishment response message may include CU-DU layered mode information, which may be used as a determining factor when the base station selects a handover target for the UE.

The second interface establishment request message may further include information of a core network to which the 5G base station 2 belongs, such as information of a core network group to which the base station belongs, or a cloud group ID, which may be used for determining a mobile type, such as initiating a handover based on the first interface or initiating a handover based on the second interface. The second interface establishment request message may further include type information of the 5G base station 2 or the cell, such as LTE, eLTE, or 5G NR. Optionally, the second interface establishment response message may further include information related to network slices of the 5G CN supported by the 5G base station 2, such as ID information of one or more network slices of the 5G CN, which may be used to select an appropriate target base station for a terminal supporting the network slice when mobility determination is performed on the terminal.

In S1003, if the process fails, the 5G base station 2 sends a second interface establishment failure message to the 5G base station 1. This configuration update failure message may include why the establishment fails, a waiting time, and the like.

The process of an embodiment 6 is described below.

6) The base station configuration updating process may include: a base station configuration update message (from a RAN node 1 to a RAN node 2), a base station configuration update confirmation message (from the RAN node 2 to the RAN node 1), and a base station configuration update failure message (from the RAN node 2 to the RAN node 1).

Figure 11:
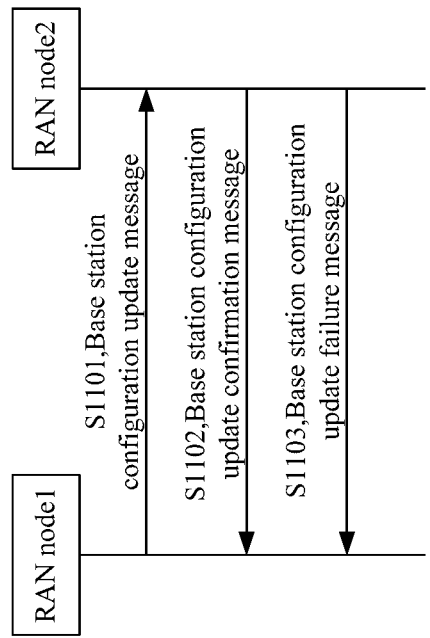
FIG. 11 is a flowchart of a method according to an embodiment 6 in the embodiment 1.

FIG. 11 is a flowchart of a method according to the embodiment 6. As shown in FIG. 11, the method includes the following steps.

In S1101, a 5G base station 1 sends a base station configuration update message to a 5G base station 2.

The base station configuration update message of the second interface may include at least one of: the serving cells under the updated base station and beam configuration information, such as one or more serving cells under the base station, and information for performing beam addition, deletion, or modification. The base station configuration update message of the second interface may further include at least one of the RAN architecture information of the updated base station, information of the core network to which the base station belongs, type information of the base station or the cell, and information related to network slices of the 5G CN supported by the base station.

In S1102, if the process is successful, the 5G base station 2 sends a base station configuration update confirmation message to the 5G base station 1. Otherwise, step S1103 is performed.

In S1103, if the process fails, the 5G base station 2 sends a base station configuration update failure message to the 5G base station 1. The configuration update failure message may include why the establishment fails, a waiting time, and the like.

The above is a description of the six sub-embodiments. By adopting the method for implementing a common process of a 5G ground interface provided in the embodiments, the new requirements and new features of the 5G system can be satisfied, and the management of the interface between the RAN and the CN (the first interface) and interface between the RAN and the RAN (the second interface) in the 5G system is realized, thereby meeting the basic requirements of the common process in the 5G system.

Embodiment 2

An embodiment provides an apparatus for implementing a common process. The apparatus may perform any one of the methods provided in the above-mentioned embodiments. Details are not described herein again.

FIG. 12 is a structural block diagram of an apparatus for implementing a common process, applied to a base station, according to the embodiment. As shown in FIG. 12, the apparatus may include a first transmitting module 122 and a first receiving module 124.

The first transmitting module 122 is configured to transmit a first request message to a core network (CN) device.

The first request message is used for applying for establishing a first interface. The first interface is an interface between a radio access network (RAN) to which the base station belongs and the CN, and the first request message carries at least one of: location area information, information of a public land mobile network (PLMN) supported by the base station, and base station type information of the base station. The location area information refers to a specific geographic area configured for paging a UE.

The first receiving module 124 is coupled to the first sending module 122, and is configured to receive a first response message transmitted by the CN device, where the first response message is used for indicating that the first interface has been successfully established.

Alternatively, the first response message carries at least one of: configuration information of the CN, information of network slices supported by the CN, and allowed load capacity information of each type of slice group in the CN. The user equipment (UE) selects a network slice in the CN according to the allowed load capacity information of the network slice, and uses the allowed load capacity information of the slice as a component of text content of the UE.

Alternatively, the configuration information of the CN includes at least one of: a CN set identification, a number of the CN device, the PLMN information, and CN cloud set identification information.

Alternatively, after the first receiving module 124 receives the first response message transmitted by the CN device, it is further configured that the base station transmits a first update message to the CN device, where the first update message is used for instructing the CN device to update configuration information of the base station. And the base station receives a first confirmation message for the first update message transmitted by the CN device.

Alternatively, the first update message carries at least one of: location area information and public land mobile network (PLMN) information.

Alternatively, after receiving the first response message transmitted by the CN device, the first receiving module 124 is further configured to receive an overload start message or an overload stop message transmitted by the CN device. The overload start message is used for indicating that the CN is overloaded, and the overload stop message is used for indicating that an overload operation is stopped.

Alternatively, the overload start message carries a slice overload message for indicating that a slice of the CN is overloaded or that a slice of the CN under a specified PLMN is overloaded.

Alternatively, the overload start message transmitted by the CN and received by the base station may include overload control operation information. The overload control operation information may include reject information for indicating a slice of the CN that rejects access.

FIG. 13 is a structural block diagram of an apparatus for implementing a common process, applied to a core network (CN) device, according to the embodiment. As shown in FIG. 13, the apparatus may include a second receiving module 132 and a second transmitting module 134.

The second receiving module 132 is configured to receive a first request message transmitted by a base station.

The first request message is used for applying for establishing a first interface. The first interface is an interface between a radio access network (RAN) to which the base station belongs and the CN, and the first request message carries at least one of: location area information, information of a public land mobile network (PLMN) supported by the base station, and base station type information of the base station. The location area information refers to a specific geographic area configured for paging a UE.

The second sending module 134 is coupled to the second receiving module 132 and is configured to transmit a first response message to the base station. The first response message is used for indicating that the first interface has been successfully established.

Alternatively, after the CN device receives the first request message transmitted by the base station, the second receiving module 132 is further configured to receive first instruction information transmitted by a user equipment (UE). The first instruction information is used for instructing the CN device to select a traffic pattern for the UE.

Alternatively, the first response message carries at least one of:

configuration information of the CN, information of network slices supported by the CN, and allowed load capacity information of each type of slice group in the CN.

The UE selects a network slice in the CN according to the allowed load capacity information of the network slice, and uses the allowed load capacity information of the slice as a component of text content of the UE.

Alternatively, the configuration information of the CN includes at least one of:

A CN set identification, the number of the CN device, the PLMN information, and CN cloud set identification information of.

Alternatively, the second sending module 134 is further configured to transmit a second update message to the base station and receive a second confirmation message for the second update message transmitted by the base station. The second update message is used for instructing the base station to update configuration information of the CN device.

The second update message carries at least one of:

configuration information of the CN, information of network slices supported by the CN, and allowed load capacity information of each type of slice group in the CN.

The configuration information of the CN includes at least one of: a CN set identification, the number of the CN device, the PLMN information, and CN cloud set identification information.

The UE selects a network slice in the CN according to the allowed load capacity information of the network slice, and uses the allowed load capacity information of the slice as a component of text content of the UE.

Alternatively, after the CN device transmits the first response message to the base station, the second sending module 134 is further configured to transmit an overload start message or an overload stop message to the base station. The overload start message is used for indicating that the CN is overloaded, and the overload stop message is used for indicating that an overload operation is stopped.

Alternatively, the overload start message carries a slice overload message for indicating that a slice of the CN is overloaded or that a slice of the CN under a specified PLMN is overloaded.

Alternatively, the overload start message transmitted by the CN device to the base station may include overload control operation information. The overload control operation information may include reject information for indicating a slice of the CN that rejects access.

FIG. 14 is a structural block diagram of an apparatus for implementing a common process, applied to a first base station, according to the embodiment. As shown in FIG. 14, the apparatus may include a third transmitting module 142 and a third receiving module 144.

The third transmitting module 142 is configured to transmit a second request message to a second base station.

The second request message is used for applying for establishing a second interface. The second interface is an interface between the first base station and the second base station, and the second request message carries at least one of: cells under the first base station, beam configuration information, information of PLMNs supported by the first base station, RAN architecture information, information of a core network (CN) connected to the base station, and base station type information of the first base station. The information of the CN includes at least one of: CN set information and CN cloud set identification information.

The third receiving module 144 is configured to receive a second response message transmitted by the second base station. The second response message is used for indicating that the second interface has been successfully established.

Alternatively, the RAN architecture information may include layered mode information of a wireless center unit (CU)-wireless distributed unit (DU) when the RAN architecture is a centralized network architecture.

Alternatively, after receiving the second response message transmitted by the second base station, the third receiving module 144 is further configured to transmit a third update message to the second base station, and receive a third confirmation message for the third update message transmitted by the second base station. The third update message is used for instructing the second base station to update configuration information of the first base station;

Alternatively, the third update message carries at least one of:

cells under the first base station after the first base station is updated, beam configuration information, RAN architecture information of the first base station, information of a CN connected to the first base station, and base station type information of the first base station.

Embodiment 3

An embodiment provides a system for implementing a common process. The system may include a base station and a CN device.

The base station transmits a first request message to the CN device, where the first request message is used for applying for establishing a first interface. The first request message is an interface between a radio access network (RAN) to which the base station belongs and the CN, and the first request message carries at least one of: location area information, information of a PLMN supported by the base station, and base station type information of the base station. The location area information refers to a specific geographic area configured for paging a UE.

The CN device receives the first request message and transmits a first response message to the base station. The first response message is used for indicating that the first interface has been successfully established.

The base station receives the first response message transmitted by the CN device.

Alternatively, the first response message carries at least one of:

configuration information of the CN, information of network slices supported by the CN, and allowed load capacity information of each type of slice group in the CN. The UE selects a network slice in the CN according to the allowed load capacity information of the network slice, and uses the allowed load capacity information of the slice as a component of text content of the UE.

Alternatively, the configuration information of the CN includes one of:

a CN set identification, the number of the CN device, the PLMN information, and CN cloud set identification information.

Embodiment 4

An embodiment provides a storage medium. Optionally, in the embodiment, the storage medium may be configured to store program codes for executing the steps described below.

In S1, a base station transmits a first request message to a CN device. The first request message is used for applying for establishing a first interface. The first interface is an interface between a radio access network (RAN) to which the base station belongs and the CN, and the first request message carries at least one of: location area information, information of a PLMN supported by the base station, and base station type information of the base station. The location area information refers to a specific geographic area configured for paging a UE.

In S2, the base station receives a first response message transmitted by the CN device. The first response message is used for indicating that the first interface has been successfully established.

Alternatively, the storage medium may further be configured to store program codes for executing the steps described below.

In S3, a first base station transmits a second request message to a second base station.

The second request message is used for applying for establishing a second interface. The second interface is an interface between the first base station and the second base station, and the second request message carries at least one of: cells under the first base station, beam configuration information, information of a PLMN supported by the first base station, RAN architecture information, information of a CN connected to the base station, and base station type information of the first base station. The information of the CN includes at least one of: the CN set information and CN cloud set identification information.

In S4, the first base station receives a second response message transmitted by the second base station. The second response message is used for indicating that the second interface has been successfully established.

Alternatively, in the embodiment, the above-mentioned storage medium may include, but is not limited to, a USB flash disk, a read-only memory (ROM), a random access memory (RAM), a mobile hard disk, a magnetic disk, an optic disk, or other mediums that may store program codes.

Alternatively, in the embodiment, a processor performs the method steps in the above-mentioned embodiments according to the program codes stored in the storage medium.

Alternatively, any method provided in the above-mentioned embodiments may be referred to in the embodiment, and details are not described herein again.

An embodiment further provides a computer-readable storage medium storing computer-executable instructions for performing any one of the above-mentioned methods.

Figure 15:
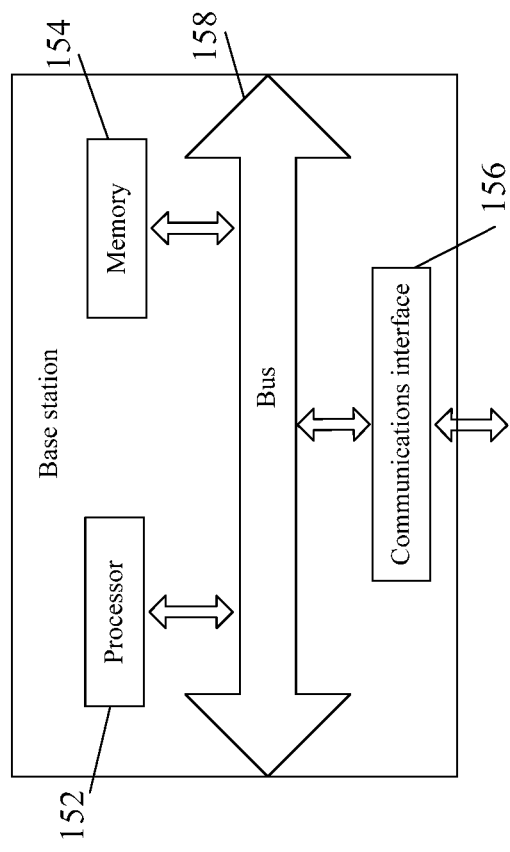
FIG. 15 is a structural diagram of a base station according to an embodiment 4.

An embodiment further provides a base station. FIG. 15 is a structural diagram of the base station according to the embodiment. As shown in FIG. 15, the base station includes a processor 152 and a memory 154, and may further include a communications interface 156 and a bus 158.

The processor 152, the memory 154, and the communications interface 156 may communicate with each other through the bus 158. The communications interface 156 may be used for information transmission. The processor 152 may invoke logic instructions in the memory 154 to perform any one of the methods of the above-mentioned embodiments.

The memory 154 may include a program storage region and a data storage region. The program storage region may store an operating system and an application program required by at least one function while the data storage region may store data created according to use of a base station. In addition, the memory may include a volatile memory, such as a random access memory (RAM), and may also include a nonvolatile memory, such as at least one dick memory, a flash memory or other nonvolatile solid-state memories.

In addition, the logic instructions in the memory 154 may be implemented in the form of a software function unit and, when sold or used as an independent product, may be stored in a computer-readable storage medium. The technical solutions of the present disclosure may be embodied in the form of a software product that may be stored in a storage medium and includes one or more instructions for enabling a computer device (which may be a personal computer, server, network device, etc.) to execute all or part of the steps of the method provided in the embodiments.

Figure 16:
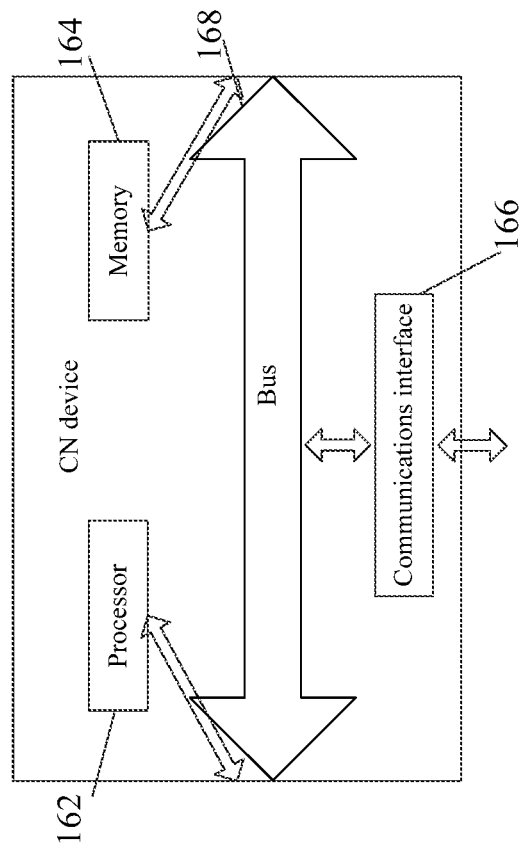
FIG. 16 is a structural diagram of a CN device according to the embodiment 4.

An embodiment further provides a CN device. FIG. 16 is a structural diagram of the CN device according to the embodiment. As shown in FIG. 16, the CN device includes a processor 162 and a memory 164, and may further include a communications interface 166 and a bus 168.

The processor 162, the memory 164, and the communications interface 166 may communicate with each other through the bus 168. The communications interface 166 may be used for information transmission. The processor 162 may invoke logic instructions in the memory 164 to perform any one of the methods of the above-mentioned embodiments.

The memory 164 may include a program storage region and a data storage region. The program storage region may store an operating system and an application program required by at least one function while the data storage region may store data created according to use of a CN device. In addition, the memory may include a volatile memory, such as a random access memory (RAM), and may also include a nonvolatile memory, such as at least one dick memory, a flash memory or other nonvolatile solid-state memories.

In addition, the logic instructions in the memory 164 may be implemented in the form of a software function unit and, when sold or used as an independent product, may be stored in a computer-readable storage medium. The technical solutions of the present disclosure may be embodied in the form of a software product that may be stored in a storage medium and includes one or more instructions for enabling a computer device (which may be a personal computer, server, network device, etc.) to execute all or part of the steps of the method provided in the embodiments.

The storage medium may be a non-transitory storage medium or a transitory storage medium. The non-transitory storage medium may include: a USB flash disk, a mobile hard disk, a read-only memory (ROM), a random access memory (RAM), a magnetic disk, an optic disk, or another medium that may store program codes.

All or part of the processes in the methods of the above-mentioned embodiments may be implemented by related hardware instructed by computer programs. These programs may be stored in a non-transitory computer-readable storage medium, and when executed, may include the processes of the methods in the above-mentioned embodiments.

What is claimed is:

1. A communication method, comprising:
    transmitting, by a base station, a first request message to a core network (CN) device to setup a first interface between the base station and the CN, wherein the first request message includes base station type information of the base station;
    receiving, by the base station, a first response message transmitted by the CN device, wherein the first response message indicates that the first interface has been successfully setup, and wherein the first response message includes a configuration information of the CN; and
    receiving, by the base station after the first response message is received, an overload start message transmitted by the CN device, wherein the overload start message indicates that the CN is overloaded, and wherein the overload start message includes a slice overload message that indicates that a slice of the CN is overloaded.

2. The method of claim 1, wherein the first response message includes allowed load capacity information of each type of slice group in the CN;
    wherein a user equipment (UE) selects a network slice in the CN according to the allowed load capacity information of the network slice, and uses the allowed load capacity information of the network slice as a component of text content of the UE.

3. The method of claim 1, wherein the configuration information of the CN comprises a public land mobile network (PLMN) information.

4. The method of claim 1, wherein after the receiving, by the base station, the first response message transmitted by the CN device, the method further comprises:
    transmitting, by the base station, a first update message to the CN device, wherein the first update message instructs the CN device to update configuration information of the base station, wherein the first update message comprises a location area information and a public land mobile network (PLMN) information; and
    receiving, by the base station, a first confirmation message in response to the first update message transmitted by the CN device.

5. A communication method, comprising:
    receiving, by a core network (CN) device, a first request message transmitted by a base station to setup a first interface between the base station and the CN, wherein the first request message includes base station type information of the base station;
    transmitting, by the CN device, a first response message to the base station, wherein the first response message indicates that the first interface has been successfully setup, and wherein the first response message includes a configuration information of the CN; and
    transmitting, by the CN device after the first response message is transmitted, an overload start message to the base station, wherein the overload start message indicates that the CN is overloaded, and wherein the overload start message includes a slice overload message that indicates that a slice of the CN is overloaded.

6. The method of claim 5, wherein the configuration information of the CN comprises a public land mobile network (PLMN) information.

7. The method of claim 5, wherein after the transmitting, by the CN device, the first response message to the base station, the method further comprises:
    transmitting, by the CN device, a second update message to the base station, wherein the second update message is used for instructing the base station to update configuration information of the CN device; and
    receiving, by the CN device, a second confirmation message for the second update message transmitted by the base station.

8. The method of claim 7, wherein the second update message includes allowed load capacity information of each type of slice group in the CN;
    wherein a user equipment (UE) selects a network slice in the CN according to the allowed load capacity information of each network slice, and uses the allowed load capacity information of the network slice as a component of text content of the UE.

9. An apparatus, comprising:
    a processor configured to:
    transmit a first request message to a core network (CN) device to setup a first interface between a base station and the CN, and wherein the first request message includes base station type information of the base station;
    receive a first response message sent by the CN device, wherein the first response message indicates that the first interface is successfully setup, and wherein the first response message includes a configuration information of the CN; and
    receive, after the first response message is received, an overload start message transmitted by the CN device, wherein the overload start message indicates that the CN is overloaded, and wherein the overload start message includes a slice overload message that indicates that a slice of the CN is overloaded.

10. A non-transitory computer-readable storage medium storing computer-executable instructions for executing a method comprising:
  receiving, by a core network (CN) device, a first request message transmitted by a base station to setup a first interface between the base station and the CN, wherein the first request message includes base station type information of the base station;
  transmitting, by the CN device, a first response message to the base station, wherein the first response message indicates that the first interface has been successfully setup, and wherein the first response message includes a configuration information of the CN; and
  transmitting, by the CN device after the first response message is transmitted, an overload start message to the base station, wherein the overload start message indicates that the CN is overloaded, and wherein the overload start message includes a slice overload message that indicates that a slice of the CN is overloaded.

11. The method of claim 1, wherein the configuration information of the CN comprises CN cloud set identification information.

12. The method of claim 1, wherein after the receiving, by the base station, the first response message transmitted by the CN device, the method further comprises:
  receiving, by the base station, an overload stop message transmitted by the CN device, wherein the overload stop message indicates that an overload operation is stopped.

13. The method of claim 1, wherein the base station type information indicates that the base station is an enhanced long-term evolution (eLTE) base station or a new radio (NR) base station.

14. The method of claim 5, wherein after the transmitting, by the CN device, the first response message to the base station, the method further comprises:
  receiving, by the CN device, a first update message from the base station, wherein the first update message instructs the CN device to update configuration information of the base station, wherein the first update message includes a location area information and a public land mobile network (PLMN) information; and
  transmitting, by the CN device, a first confirmation message to the base station in response to the first update message received by the CN device.

15. The method of claim 5, wherein after the transmitting, by the CN device, the first response message to the base station, the method further comprises:
  transmitting, by the CN device, an overload stop message to the base station, wherein the overload stop message indicates that an overload operation is stopped.

16. The method of claim 5, wherein the base station type information indicates that the base station is an enhanced long-term evolution (eLTE) base station or a new radio (NR) base station.

17. The apparatus of claim 9, wherein the first response message includes allowed load capacity information of each type of slice group in the CN;
  wherein a user equipment (UE) selects a network slice in the CN according to the allowed load capacity information of the network slice, and uses the allowed load capacity information of the network slice as a component of text content of the UE.

18. The apparatus of claim 9, wherein the configuration information of the CN comprises a public land mobile network (PLMN) information.

19. The apparatus of claim 9, wherein after the first response message is received, the processor is further configured to:
  transmit a first update message to the CN device, wherein the first update message instructs the CN device to update configuration information of the base station, wherein the first update message comprises a location area information and a public land mobile network (PLMN) information; and
  receiving, by the base station, a first confirmation message in response to the first update message transmitted by the CN device.

20. The non-transitory computer-readable storage medium of claim 10, wherein the configuration information of the CN comprises a public land mobile network (PLMN) information.

21. An apparatus, comprising:
  a processor configured to:
  receive, by a core network (CN) device, a first request message transmitted by a base station to setup a first interface between the base station and the CN, wherein the first request message includes base station type information of the base station;
  transmit, by the CN device, a first response message to the base station, wherein the first response message indicates that the first interface has been successfully setup, and wherein the first response message includes a configuration information of the CN; and
  transmit, by the CN device after the first response message is transmitted, an overload start message to the base station, wherein the overload start message indicates that the CN is overloaded, and wherein the overload start message includes a slice overload message that indicates that a slice of the CN is overloaded.

22. The apparatus of claim 21, wherein the configuration information of the CN comprises a public land mobile network (PLMN) information.

* * * * *

UNITED STATES PATENT AND TRADEMARK OFFICE
CERTIFICATE OF CORRECTION

PATENT NO. : 10,880,780 B2
APPLICATION NO. : 16/261530
DATED : December 29, 2020
INVENTOR(S) : Yin Gao et al.

It is certified that error appears in the above-identified patent and that said Letters Patent is hereby corrected as shown below:

In the Drawings

• In Fig. 13, for Tag "132", delete "transmitting" and insert -- receiving --, therefor.

In the Specification

• In Column 9, Line 16, delete "interface)" and insert-- interface). --, therefor.

• In Column 10, Line 55, delete "interface)" and insert -- interface). --, therefor.

• In Column 13, Line 41, delete "accessing to the" and insert -- accessing the --, therefor.

• In Column 17, Line 20, delete "second transmitting module 134." and insert -- second sending module 134. --, therefor.

• In Column 18, Line 60, delete "station;" and insert -- station. --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*